United States Patent
Iio et al.

(10) Patent No.: US 6,576,313 B2
(45) Date of Patent: Jun. 10, 2003

(54) BONDED LAMINATE STRUCTURE, HOSE CONTAINING THE BONDED LAMINATE STRUCTURE, AND METHODS FOR PRODUCING THE SAME

(75) Inventors: Shinji Iio, Komaki (JP); Kazutaka Katayama, Komaki (JP); Hiroaki Ito, Kasugai (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/084,368

(22) Filed: Feb. 28, 2002

(65) Prior Publication Data
US 2002/0164489 A1 Nov. 7, 2002

(30) Foreign Application Priority Data
Mar. 1, 2001 (JP) .......................... 2001-057170

(51) Int. Cl.⁷ .................. B32B 27/08; B32B 27/16; B32B 27/34; B32B 27/36; B32B 31/12
(52) U.S. Cl. .............. 428/36.91; 428/36.9; 428/475.2; 428/480; 156/272.2; 156/272.6; 156/273.3; 156/297; 156/307.1; 156/308.2; 427/532; 427/533; 427/535; 427/536; 427/569
(58) Field of Search ............... 428/36.9, 36.91, 428/475.2, 480, 421, 422; 156/272.2, 272.6, 273.3, 297, 307.1, 308.2; 427/532, 533, 535, 536, 569

(56) References Cited
U.S. PATENT DOCUMENTS

| | | | |
|---|---|---|---|
| 5,718,957 A | 2/1998 | Yokoe et al. | ............. 428/36.91 |
| 5,919,326 A | 7/1999 | Yokoe et al. | ................ 156/244 |
| 6,446,673 B1 * | 9/2002 | Iio et al. | ..................... 138/137 |

FOREIGN PATENT DOCUMENTS

WO    WO95/07176    3/1995

* cited by examiner

*Primary Examiner*—Vivian Chen
(74) *Attorney, Agent, or Firm*—Armstrong, Westerman & Hattori, LLP

(57) ABSTRACT

A bonded laminate structure which is obtainable by bonding a PBN layer (or PBT layer) to a thermoplastic resin layer without the use of an adhesive material. The bonded laminate structure comprises: a first layer comprising at least one of polybutylene naphthalate (PBN) and polybutylene terephthalate (PBT) as an essential component and having a surface subjected to an electric discharge treatment such as a plasma treatment; and a second layer comprising an amine-rich resin as an essential component and bonded to the surface of the first layer.

7 Claims, 1 Drawing Sheet

BONDED LAMINATE STRUCTURE, HOSE CONTAINING THE BONDED LAMINATE STRUCTURE, AND METHODS FOR PRODUCING THE SAME

BACKGROUND OF THE INVENTION

1. Field of the Invention

The present invention relates to a bonded laminate structure, a hose containing the bonded laminate structure, and methods for producing the same.

2. Description of the Art

To comply with recent stricter regulations against automotive evaporative emissions, various types of less permeable fuel hoses have been under consideration. Less permeable resins such as polybutylene naphthalate (PBN) and polybutylene terephthalate (PBT) are typically employed as materials for such hoses.

However, a hose having a low-permeability resin layer of PBN or PBT alone is unacceptable because of its high rigidity. Therefore, it is a common practice to provide a laminate structure comprising a low-permeability resin layer having a reduced thickness and a thermoplastic resin layer such as of a polyamide. However, since PBN and PBT do not adhere well to the thermoplastic resin (e.g., polyamide), the provision of an adhesive layer between the low-permeability resin layer of PBN (or PBT) and the thermoplastic resin layer is required. This complicates the structure of the hose, and increases the costs due to the use of a costly adhesive material. In addition, an extrusion process employing the adhesive material requires a higher temperature setting to provide enhanced adhesion. This higher temperature may result in instability of the properties of the hose, because PBN and PBT are susceptible to molecular degradation when being subjected to a high temperature.

In view of the foregoing, it is an object of the present invention to provide a bonded laminate structure which is obtainable by bonding a PBN layer (or a PBT layer) to a thermoplastic resin layer without the use of an adhesive material, a hose having such a bonded laminate structure, and methods for producing the same.

SUMMARY OF THE INVENTION

In accordance with a first aspect of the present invention to achieve the aforesaid object, there is provided a bonded laminate structure which comprises: a first layer comprising at least one of polybutylene naphthalate (PBN) and polybutylene terephthalate (PBT) as an essential component and having a surface subjected to an electric discharge treatment such as a plasma treatment; and a second layer comprising an amine-rich resin as an essential component and bonded to the surface of the first layer.

In accordance with a second aspect of the present invention, there is provided a hose which comprises a bonded laminate structure according to the first inventive aspect, wherein the first layer thereof is provided radially inwardly of the second layer thereof.

In accordance with a third aspect of the present invention, there is provided a method for producing a bonded laminate structure according to the first inventive aspect, which comprises the steps of: subjecting a surface of a first layer comprising at least one of polybutylene naphthalate and polybutylene terephthalate as an essential component to an electric discharge treatment such as a plasma treatment to cause the surface of the first layer to have an oxygen-to-carbon atomic ratio (O/C) of not smaller than 0.35; and bonding a second layer comprising an amine-rich resin as an essential component to the surface of the first layer.

In accordance with a fourth aspect of the present invention, there is provided a method for producing a hose according to the second inventive aspect, which comprises the steps of: subjecting an outer surface of a first layer comprising at least one of polybutylene naphthalate and polybutylene terephthalate as an essential component to an electric discharge treatment such as a plasma treatment to cause the outer surface of the first layer to have an oxygen-to-carbon atomic ratio (O/C) of not smaller than 0.35; and bonding a second layer comprising an amine-rich resin as an essential component to the outer surface of the first layer, whereby the first layer is provided radially inwardly of the second layer.

The inventors of the present invention have conducted intensive studies to provide a bonded laminate structure which is obtainable by bonding a PBN layer (or a PBT layer) to a thermoplastic resin layer without the use of an adhesive material. As a result, the inventors have found that the intended object is attainable by subjecting a surface of a first layer comprising at least one of polybutylene naphthalate (PBN) and polybutylene terephthalate (PBT) as an essential component to an electric discharge treatment such as a plasma treatment, and bonding a second layer comprising an amine-rich resin as an essential component to the surface of the first layer to provide a bonded laminate structure comprising the first layer and the second layer. Thus, the present invention has been achieved. By activating the surface of the first layer to be bonded to the second layer through the electric discharge treatment (e.g., plasma treatment), hydrogen atoms are removed from the molecular skeleton of PBN or PBT, so that carbon radicals are generated in the surface. The surface of the first layer is at least partly strengthened by a cross-linking reaction caused by some of the carbon radicals. The other carbon radicals in the surface of the first layer bond to oxygen in air, thereby forming functional groups such as hydroxyl groups, carboxyl groups, aldehyde groups, and ketone groups. On the other hand, the second layer comprising the amine-rich resin has a higher amino group content than an ordinary or conventional resin, because the amine-rich resin is typically obtained by mixing a compound having amino groups with a thermoplastic resin such as a polyamide or by causing the compound having amino groups to react with the thermoplastic resin. Therefore, the amino groups in the second layer have a remarkable affinity for the functional groups in the surface of the first layer. This supposedly provides adhesion between the first layer and the second layer.

In the present invention, the amine-rich resin is defined as having an amino group content of not lower than about $4.5 \times 10^{-5}$ g equivalents/g.

DESCRIPTION OF THE PREFERRED EMBODIMENTS

Embodiments of the present invention will hereinafter be described in detail.

Figure 1:
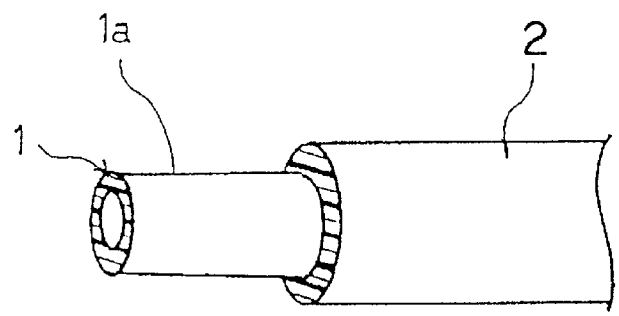
FIG. 1 is a diagram illustrating the construction of an exemplary hose according to the present invention.

First, an explanation will be given to a hose as a specific example of a bonded laminate structure according to the present invention. As shown in FIG. 1, the inventive hose includes an inner layer 1 composed of a material comprising at least one of polybutylene naphthalate (PBN) and polybutylene terephthalate (PBT) as an essential component, and an outer layer 2 composed of a material comprising an amine-rich resin as an essential component and provided on an outer peripheral surface 1a of the inner layer 1. The present invention is primarily characterized in that the outer peripheral surface 1a of the inner layer 1 has been subjected to an electric discharge treatment such as a plasma treatment, whereby the outer layer 2 is firmly bonded to the outer peripheral surface 1a of the inner layer 1.

The material for the inner layer 1 may comprise a thermoplastic polyester elastomer (TPEE) containing PBN or PBT hard segments. The TPEE may be co-extruded or blended with PBN or PBT. Further, PBN, PBT, a blend of the TPEE and PBN or PBT, or the TPEE may be imparted with electrical conductivity by carbon black, carbon nanotubes, metal powder or the like.

The electric discharge treatment to be performed on the outer peripheral surface 1a of the inner layer 1 is not particularly limited, but examples thereof include a plasma treatment and a corona treatment.

The material for the outer layer 2 provided on the outer peripheral surface of the inner layer 1 comprises the amine-rich resin as the essential component. In the present invention, the amine-rich resin is defined as having an amino group content of not lower than about $4 \times 10^{-5}$ g equivalents/g as described above. Ordinary or conventional polyamides not enriched with amine have an amino group content of about $3 \times 10^{-5}$ g equivalents/g, which is lower than the amino group content of the amine-rich resin used in the present invention. The amino group content can be determined, for example, by a potentiometric neutralization titration method.

The amine-rich resin can be obtained, for example, by mixing a compound having amino groups with a thermoplastic resin or by causing the compound having amino groups to react with the thermoplastic resin. Examples of the thermoplastic resin include polyamides and polyolefins. In terms of heat resistance, fuel oil resistance and mechanical strength, polyamides are preferred. Specific examples of the polyamides include nylon 6, copolymers of nylon 6 and nylon 66 (nylon 6/66), copolymers of nylon 6 and nylon 12 (nylon 6/12), nylon 11 and nylon 12, among which nylon 11 and nylon 12 are preferred. Examples of the polyolefins include polyethylene, polypropylene, polybutene, ethylene-propylene copolymers and thermoplastic olefin elastomers. These thermoplastic resins may be used either alone or in combination. The compound having amino groups which is to be mixed with or caused to react with the thermoplastic resin is not particularly limited, but examples thereof include m-xylylenediamine, p-xylylenediamine, hexamethylenediamine, dodecamethylenediamine, aliphatic diamines, aliphatic polyamines, γ-aminopropyltrimethoxysilane, N-β(aminoethyl) γ-aminopropyltrimethoxysilane and amino-modified resins.

Where a polyamide is employed as the thermoplastic resin, the amine-rich resin can be obtained by melt-mixing the compound having amino groups with the polyamide, or by modifying carboxyl groups of the polyamide with amino groups after polymerization (e.g., by bonding amino groups of a diamine compound to terminal carboxyl groups). Where a polyolefin such as polyethylene, polypropylene, polybutene, an ethylene-propylene copolymer or a thermoplastic olefin elastomer is employed as the thermoplastic resin, the amine-rich resin can be obtained by adding amino groups to the polyolefin in substantially the same manner as described above.

The material for the outer layer 2 may comprise an impact-resistant polymer, a plasticizer, an anti-aging agent, a processing agent, a coloring agent or the like in addition to the amine-rich resin.

Figure 2:
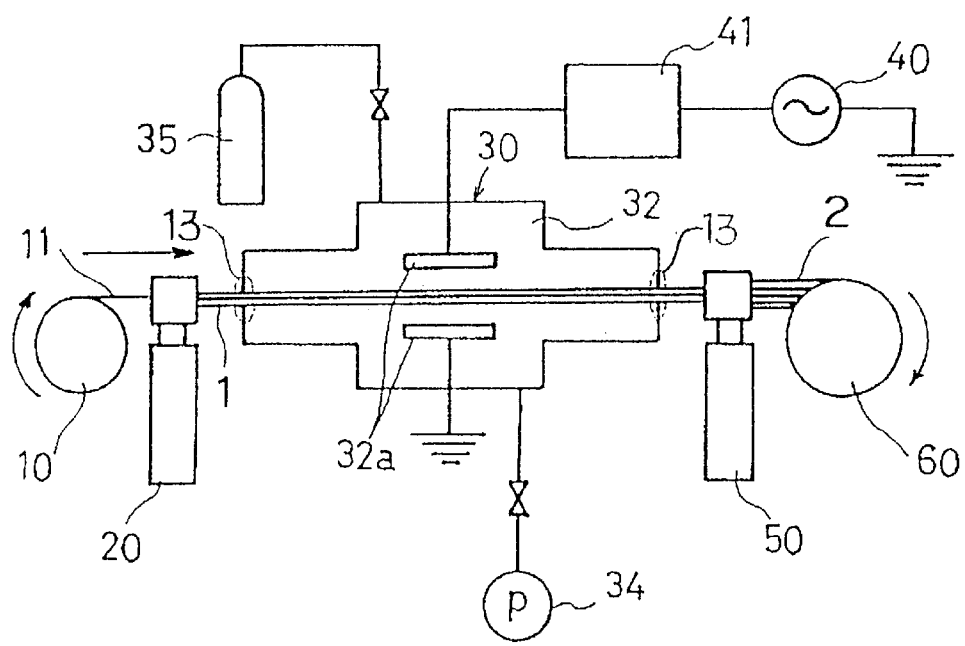
FIG. 2 is a schematic diagram for explaining a method for producing the hose according to the present invention.

The hose according to the present invention can be produced, for example, in the following manner. As shown in FIG. 2, a mandrel 11 is fed from a mandrel feeder 10 into an extruder 20 at a feed rate of 3 to 20 m/minute. The inner layer material is extruded around the mandrel 11 by means of the extruder 20 for formation of the inner layer 1. Then, the inner layer 1 is introduced to a discharge chamber 32 within a vacuum plasma treatment apparatus 30 through a sealing portion 13. After the discharge chamber 32 is evacuated to $10^{-3}$ Torr by means of a vacuum pump 34, a discharge gas (Ar, $N_2$, $O_2$, $H_2$ or the like) is supplied from a gas supplier 35 to maintain a predetermined vacuum state (0.005 to 8 Torr). The inner layer 1 is transported through a space defined between electrodes 32a in the discharge chamber 32. A matched high-frequency high-output current is applied to the electrodes 32a for a predetermined period by means of a high-frequency power supply 40 and a matching box 41, whereby electrical discharge occurs in the space between the electrodes 32a to ionize the discharge gas for generation of plasma. Thus, the outer peripheral surface 1a of the inner layer 1 is subjected to the plasma treatment. After the plasma treatment, the inner layer 1 is transported out of the vacuum plasma treatment apparatus 30 through a sealing portion 13 to a layer extruder 50. Subsequently, the outer layer material is directly extruded onto the surface 1a of the inner layer 1 by means of the layer extruder 50 at a predetermined temperature for formation of the outer layer 2. The resulting hose is wound by a mandrel winder 60. Thus, the production of the hose is completed.

Conditions for the plasma treatment are not particularly limited. The frequency of the current is typically in the range of 0.1 to 1,000 MHz, preferably 1 to 100 MHz. The output of the high-frequency power supply is typically in the range of 2 to 300 W, preferably 5 to 200 W. A treatment time is typically in the range of 2 to 180 seconds, preferably 5 to 60 seconds.

Although a mandrel is employed in the aforesaid hose production method, the hose may be produced without the use of the mandrel. Further, the outer peripheral surface 1a of the inner layer 1 subjected to the plasma treatment may be coated with a coupling agent for enhanced adhesion.

The outer peripheral surface 1a of the inner layer 1 of the hose thus produced in accordance with the present invention preferably has an oxygen-to-carbon atomic ratio (O/C atomic ratio which is the ratio of the number of oxygen atoms (O) to the number of carbon atoms (C)) of not smaller than 0.35, more preferably in the range of 0.36 to 0.5. If the O/C atomic ratio is smaller than 0.35, adhesion of the outer layer 2 to the outer peripheral surface 1a of the inner layer 1 is unsatisfactory. The number of oxygen atoms (O) and the number of carbon atoms (C) are determined by the photoelectron spectroscopy (ESCA).

The thickness of each of the layers of the hose according to the present invention differs depending on the use of the hose. For use as a fuel hose, the inner layer 1 typically has a thickness of 0.05 to 1.0 mm, preferably 0.05 to 0.8 mm, and the outer layer 2 typically has a thickness of 0.1 to 1.5 mm, preferably 0.3 to 1.0 mm. The hose typically has an inner diameter of 3 to 60 mm, preferably 4 to 50 mm.

The structure of the hose according to the present invention is not limited to a two-layer structure as shown in FIG. 1. The hose may have a multilayer structure consisting of three or more layers, as long as the hose has a bonded laminate structure which comprises the first layer comprising at least one of PBN and PBT as the essential component and the second layer comprising the amine-rich resin as the essential component. For example, the first layer may have a two-sublayer structure consisting of an innermost sublayer composed of a conductive PBN (or PBT) and an outer sublayer composed of an ordinary PBN (or PBT). Alternatively, the first layer may have a two-sublayer structure consisting of an innermost sublayer composed of a non-conductive (or conductive) TPEE or a blend of PBN (or PBT) and TPEE and an outer sublayer composed of PBN (or PBT). Where the first layer has a two-sublayer structure, exemplary combinations of the materials for the innermost sublayer and the outer sublayer are: a PBN material and a PBN material; a PBT material and a PBT material; a PBT material and a PBN material; and a PBN material and a PBT material.

If necessary, a solid or sponge protector may be fitted around the inventive hose.

The bonded laminate structure according to the present invention is advantageously employed for automotive hoses such as a feed hose, a return hose, a breather hose, an evaporation hose and a filler hose. Besides, the inventive bonded laminate structure is applicable to diaphragms, bottles, tanks, electric and electronic components, chemical-related components, and other applications.

Next, an explanation will be given to Examples and Comparative Examples.

Prior to the explanation of Examples and Comparative Examples, ingredients employed in these examples will be described below. It is noted that the amounts of the ingredients are given as parts by weight unless otherwise specified.

PBN
  TQB-OT available from Teijin Ltd.
PBT
  CELANEX 2001 available from Polyplastics Co., Ltd.
Conductive PBN
  Prepared by mixing 10 parts of carbon black (KETJEN BLACK EC available from Akzo Co., Ltd.) with 100 parts of PBN (TQB-OT available from Teijin Ltd.) at 260° C. by means of a KCK mixer.
Conductive PBT
  Prepared by mixing 10 parts of carbon black (KETJEN BLACK EC available from Akzo Co., Ltd.) with 100 parts of PBT (CELANEX 2001 available from Polyplastics Co., Ltd.) at 260° C. by means of a KCK mixer.
TPEE ①
  PELPRENE EN5000 (available from Toyobo Co., Ltd.) containing PBN hard segments and aliphatic polyether soft segments.
TPEE ②
  PELPRENE P-150B (available from Toyobo Co., Ltd.) containing PBT hard segments and aliphatic polyether soft segments.
TPEE ③
  ARNITEL UM622 (available from DSM JSR ENGINEERING PLASTIC K.K.) containing PBT hard segments and aliphatic polyester soft segments.
Conductive TPEE ①
  Prepared by mixing 10 parts of carbon black (KETJEN BLACK EC available from Akzo Co., Ltd.) with 100 parts of TPEE (PELPRENE EN5000 available from Toyobo Co., Ltd.) at 260° C. by means of a KCK mixer.
Conductive TPEE ②
  Prepared by mixing 10 parts of carbon black (KETJEN BLACK EC available from Akzo Co., Ltd.) with 100 parts of TPEE (PELPRENE P-150B available from Toyobo Co., Ltd.) at 260° C. by means of a KCK mixer.
Amine-Rich Resin ①
  Nylon 12 (containing 5 wt % of a plasticizer) with carboxyl groups thereof modified with dodecamethylenediamine (amino group content: $4 \times 10^{-5}$ g equivalents/g)
Amine-Rich Resin ②
  Nylon 12 (containing 5 wt % of a plasticizer) with carboxyl groups thereof modified with dodecamethylenediamine (amino group content: $5 \times 10^{-5}$ g equivalents/g)
Amine-Rich Resin ③
  Prepared by mixing dodecamethylenediamine with a polyolefin (HDPE) by means of a twin screw extruder (amino group content: $5 \times 10^{-5}$ g equivalents/g)
Ordinary Polyamide not Enriched with Amine
  Nylon 12 (containing 5 wt % of a plasticizer) (amino group content: $3 \times 10^{-5}$ g equivalents/g)

EXAMPLE 1

With the use of a vacuum plasma treatment apparatus as described above, a fuel hose was produced by employing the PBN (TQB-OT available from Teijin Ltd.) as an inner layer material and the amine-rich resin ① (nylon 12 (containing 5 wt % of a plasticizer) with carboxyl groups thereof modified with dodecamethylenediamine (amino group content: $4 \times 10^{-5}$ g equivalents/g)) as the outer layer material. More specifically, the PBN was extruded at a rate of 10 m/minute by means of an inner-layer extruder for formation of an inner layer having an inner diameter of 6.0 mm and a thickness of 0.2 mm. Then, the inner layer was introduced to a discharge chamber within a vacuum plasma treatment apparatus. After the discharge chamber was evacuated to $10^{-3}$ Torr by means of a vacuum pump, a discharge gas was supplied from a gas supplier to maintain a predetermined vacuum state (discharge gas: Ar, pressure: 0.1 Torr). The inner layer was transported through a space defined between electrodes in the discharge chamber. High-frequency power having an impedance matched frequency of 13.56 MHz and an output of 10 W was applied to the electrodes by means of a high-frequency power supply and a matching box to cause a glow discharge for generation of plasma. Thus, the outer peripheral surface of the inner layer was subjected to the plasma treatment. After the plasma treatment, the inner layer was transported out of the vacuum plasma treatment apparatus to a layer extruder. Subsequently, the amine-rich resin ① was directly extruded around the inner layer by means of the layer extruder at 240° C. for formation of an outer layer having a thickness of 0.8 mm. The resulting hose was wound up.

EXAMPLES 2 TO 17 AND COMPARATIVE EXAMPLES 1 AND 2

Fuel hoses were produced in substantially the same manner as in Example 1, except that materials for the individual layers and discharge gases for the vacuum plasma treatment as shown in Tables 1 to 4 were employed. In the case of fuel hoses having an intermediate layer (Examples 7 to 12, 15 and 17), formation of the inner layer and the intermediate layer was achieved by co-extruding an inner layer material and an intermediate layer material with a die. Then, an outer peripheral surface of the intermediate layer was subjected to the plasma treatment, and the outer layer material was directly extruded onto the outer peripheral surface of the intermediate layer for the formation of the outer layer.

Evaluation tests for the following properties were performed on each of the fuel hoses of Examples 1 to 17 and Comparative Examples 1 and 2 thus produced, and the results are shown in Tables 1 to 4.

O/C Atomic Ratio

The O/C atomic ratio in the outer peripheral surface of the inner layer or the intermediate layer (PBN or PBT layer) subjected to the plasma treatment was determined by the photoelectron spectroscopy (ESCA). More specifically, the O/C atomic ratio was determined under the following conditions by means of a photoelectron spectrometer (PHI-5600ci available from ULVAC-PHI Inc.).

Excitation X-ray: Al, $K_{\alpha 1,2}$-ray (1486.6 eV)
X-ray output: 14 kV, 10.7 mA
Temperature: 20° C.
Degree of Vacuum: $3 \times 10^{-8}$ Torr Initial Adhesion The fuel hoses were each cut into halves for preparation of a 100-mm long sample strip. In an initial adhesion test, the sample strip was placed in a tensile tester (JIS B 7721) with an inner layer side (PBN or PBT layer side) thereof fixed to the tester, and the outer layer (amine-rich resin layer or ordinary polyamide layer not enriched with amine) was pulled at a rate of 50 mm/minute. Thus, the initial adhesion between the outer layer and the inner layer or the intermediate layer was measured.

Adhesion After Heat Aging

After heat aging was performed on the fuel hoses at 100° C. for 72 hours, the adhesion between the outer layer and the inner layer or the intermediate layer was measured in the same manner as in the initial adhesion test.

Adhesion After Immersion in Fuel

After a mixture (Fuel C/M15) containing Fuel C (toluene/isooctane=50 vol %/50 vol %) and methanol in a ratio of 85 vol %/15 vol % was filled and sealed in each of the fuel hoses and allowed to stand at 60° C. for 48 hours, the adhesion between the outer layer and the inner layer or the intermediate layer was measured in the same manner as in the initial adhesion test.

Fuel Permeation

After a mixture (Fuel C/E10) containing Fuel C and ethanol in a ratio of 90 vol %/10 vol % was filled and sealed in each of the fuel hoses and allowed to stand at 40° C. for 168 hours, the mixture was drained. Then, the mixture (Fuel C/E10) was refilled and sealed in the fuel hose and allowed to stand at 40° C. for 72 hours. The fuel permeation (mg) of the fuel hose per unit length of 1 m per day was calculated on the basis of a difference in the weight of the refilled hose measured before and after the 72-hour standing period.

TABLE 1

| | Example | | | | | |
|---|---|---|---|---|---|---|
| | 1 | 2 | 3 | 4 | 5 | 6 |
| Inner layer material | PBN | PBN | PBN | PBN | PBT | Conductive PBN |
| Intermediate layer material | — | — | — | — | — | — |
| Outer layer material | Amine-rich resin ① | Amine-rich resin ② | Amine-rich resin ② | Amine-rich resin ② | Amine-rich resin ② | Amine-rich resin ② |
| Thickness (mm) | | | | | | |
| Inner layer | 0.2 | 0.2 | 0.2 | 0.2 | 0.2 | 0.2 |
| Intermediate layer | — | — | — | — | — | — |
| Outer layer | 0.8 | 0.8 | 0.8 | 0.8 | 0.8 | 0.8 |
| Amino group content (g equivalent/g) | $4 \times 10^{-5}$ | $5 \times 10^{-5}$ | $5 \times 10^{-5}$ | $5 \times 10^{-5}$ | $5 \times 10^{-5}$ | $5 \times 10^{-5}$ |
| Discharge gas | Ar | Ar | $N_2$ | $O_2$ | Ar | Ar |
| O/C atomic ratio | 0.38 | 0.38 | 0.35 | 0.46 | 0.48 | 0.43 |
| Adhesion (N/cm) | | | | | | |
| Initial | 35.6 | 40.8 | 33.3 | 40.9 | 42.1 | 38.4 |
| After heat aging | 38.6 | 43.1 | 37.8 | 42.2 | 46.6 | 39.1 |
| After fuel immersion | 27.3 | 35.9 | 24.1 | 33.3 | 36.2 | 28.0 |
| Fuel permeation (mg/m/day) | 0.6 | 0.6 | 0.5 | 0.6 | 4.7 | 1.0 |

TABLE 2

| | Example | | | | | |
|---|---|---|---|---|---|---|
| | 7 | 8 | 9 | 10 | 11 | 12 |
| Inner layer material | Conductive PBN | Conductive PBT | TPEE ① | TPEE ② | Conductive TPEE ① | Conductive TPEE ② |
| Intermediate layer material | PBN | PBT | PBN | PBT | PBN | PBT |
| Outer layer material | Amine-rich resin ② | Amine-rich resin ② | Amine-rich resin ② | Amine-rich resin ② | Amine-rich resin ② | Amine-rich resin ② |
| Thickness (mm) | | | | | | |
| Inner layer | 0.1 | 0.1 | 0.3 | 0.3 | 0.3 | 0.3 |
| Intermediate layer | 0.1 | 0.1 | 0.2 | 0.2 | 0.2 | 0.2 |
| Outer layer | 0.8 | 0.8 | 0.5 | 0.5 | 0.5 | 0.5 |
| Amino group content | $5 \times 10^{-5}$ | $5 \times 10^{-5}$ | $5 \times 10^{-5}$ | $5 \times 10^{-5}$ | $5 \times 10^{-5}$ | $5 \times 10^{-5}$ |

TABLE 2-continued

| | Example | | | | | |
|---|---|---|---|---|---|---|
| | 7 | 8 | 9 | 10 | 11 | 12 |
| (g equivalent/g) | | | | | | |
| Discharge gas | Ar | Ar | Ar | Ar | Ar | Ar |
| O/C atomic ratio | 0.38 | 0.48 | 0.38 | 0.48 | 0.38 | 0.48 |
| Adhesion (N/cm) | | | | | | |
| Initial | 36.5 | 46.4 | 38 | 41.9 | 38.6 | 45.1 |
| After heat aging | 40.5 | 49.9 | 39.5 | 45.1 | 40.3 | 49.2 |
| After fuel immersion | 29.2 | 38.8 | 32.1 | 34.4 | 33.9 | 37.2 |
| Fuel permeation (mg/m/day) | 0.8 | 0.8 | 0.5 | 3.3 | 0.5 | 3.1 |

TABLE 3

| | Example | | | | |
|---|---|---|---|---|---|
| | 13 | 14 | 15 | 16 | 17 |
| Inner layer material | *1 | *2 | TPEE ① | PBN | TPEE ③ |
| Intermediate layer material | — | — | *1 | — | PBN |
| Outer layer material | Amine-rich resin ② | Amine-rich resin ② | Amine-rich resin ② | Amine-rich resin ③ | Amine-rich resin ② |
| Thickness (mm) | | | | | |
| Inner layer | 0.3 | 0.3 | 0.3 | 0.2 | 0.3 |
| Intermediate layer | — | — | 0.2 | — | 0.2 |
| Outer layer | 0.7 | 0.7 | 0.5 | 0.8 | 0.5 |
| Amino group content (g equivalent/g) | $5 \times 10^{-5}$ | $5 \times 10^{-5}$ | $5 \times 10^{-5}$ | $5 \times 10^{-5}$ | $5 \times 10^{-5}$ |
| Discharge gas | Ar | Ar | Ar | Ar | Ar |
| O/C atomic ratio | 0.36 | 0.36 | 0.36 | 0.38 | 0.38 |
| Adhesion (N/cm) | | | | | |
| Initial | 32.7 | 35.6 | 31.9 | 35.2 | 37.4 |
| After heat aging | 36.2 | 38.8 | 34.0 | 38.9 | 40.3 |
| After fuel immersion | 22.3 | 24.8 | 22.5 | 23.9 | 32.5 |
| Fuel permeation (mg/m/day) | 1.2 | 5.0 | 4.3 | 0.7 | 0.4 |

*1: PBN + TPEE ① [PBN/TPEE ① = 80/20 (wt %)]
*2: PBT + TPEE ② [PBT/TPEE ② = 80/20 (wt %)]

TABLE 4

| | Comparative Example | |
|---|---|---|
| | 1 | 2 |
| Inner layer material | PBN | PBN |
| Intermediate layer material | — | — |
| Outer layer material | Polyamide | Amine-rich resin ① |
| Thickness (mm) | | |
| Inner layer | 0.2 | 0.2 |
| Intermediate layer | — | — |
| Outer layer | 0.8 | 0.8 |
| Amino group content (g equivalent/g) | $3 \times 10^{-5}$ | $4 \times 10^{-5}$ |
| Discharge gas | Ar | — |
| O/C atomic ratio | 0.38 | 0.23 |
| Adhesion (N/cm) | | |
| Initial | 2.5 | 4.4 |
| After heat aging | 2.9 | 5.0 |
| After fuel immercion | Peeled off during immersion | |
| Fuel permeation (mg/m/day) | 0.5 | 0.6 |

As can be understood from the results shown in Tables 1 to 4, the fuel hoses of Examples 1 to 17 were excellent in adhesion between the outer layer (amine-rich resin layer) and the inner layer or the intermediate layer (PBN or PBT layer), and low in fuel permeation.

By contrast, the fuel hose of Comparative Example 1 was extremely low in adhesion between the inner layer and the outer layer. This is because the amino group content of the outer layer (polyamide resin layer) was excessively low though the outer peripheral surface of the inner layer (PBN layer) was subjected to the plasma treatment. The fuel hose of Comparative Example 2 was extremely low in adhesion between the inner layer and the outer layer. This is because the outer peripheral surface of the inner layer (PBN layer) was not subjected to the plasma treatment though the amine-rich resin was employed as the outer layer material.

As described above, the bonded laminate structure according to the present invention comprises: the first layer comprising at least one of polybutylene naphthalate (PBN) and polybutylene terephthalate (PBT) as an essential component and having a surface subjected to an electric discharge treatment such as a plasma treatment; and a second layer comprising an amine-rich resin as an essential component and bonded to the surface of the first layer. By activating the surface of the first layer to be bonded to the second layer through the electric discharge treatment (e.g., plasma treatment), hydrogen atoms are removed from the molecular skeleton of PBN or PBT, so that carbon radicals are generated in the surface. The surface of the first layer is at least partly strengthened by a cross-linking reaction caused by some of the carbon radicals. The other carbon radicals in the surface of the first layer bond to oxygen in air, thereby forming functional groups such as hydroxyl groups, carboxyl groups, aldehyde groups and ketone groups. On the other hand, the second layer comprising the amine-rich resin as the essential component has a higher amino group content than an ordinary or conventional resin, because the amine-rich resin is typically prepared by mixing a compound having amino groups with a thermoplastic resin such as a polyamide or by causing the compound having amino groups to react with the thermoplastic resin. Therefore, the amino groups in the second layer have a remarkable affinity for the functional groups in the surface of the first layer, supposedly providing adhesion between the first layer and the second layer.

The production methods for the bonded laminate structure and the hose according to the present invention do not require an adhesive applying step and thus are so-called adhesive-less processes, thereby simplifying the production process and reducing the costs. Without the use of an adhesive agent, there is no need to give consideration to the pot life and concentration control of the adhesive agent, thereby ensuring stable production. In addition, an organic solvent is no longer required for dilution of the adhesive agent, so that the subject methods are free from problems associated with the environmental pollution due to the solvent. Further, the subject methods obviate the need for performing a conventional extrusion process employing an adhesive agent. Therefore, PBN and PBT can maintain their intrinsic physical properties (low permeability) without molecular degradation thereof which may otherwise occur due to a high-temperature environment in the conventional extrusion process.

What is claimed is:

1. A bonded laminate structure comprising:
    a first layer comprising at least one of polybutylene naphthalate and polybutylene terephthalate as an essential component and having a surface subjected to an electric discharge treatment; and
    a second layer comprising an amine-rich resin as an essential component and bonded to the surface of the first layer.

2. A bonded laminate structure as set forth in claim 1, wherein the electric discharge treatment is a plasma treatment.

3. A bonded laminate structure as set forth in claim 1, wherein the amine-rich resin is a resin prepared by mixing a compound having amino groups with a thermoplastic resin.

4. A bonded laminate structure as set forth in claim 1, wherein the amine-rich resin is a resin prepared by reacting a compound having amino groups with a thermoplastic resin.

5. A hose comprising a bonded laminate structure as recited in claim 1, wherein the first layer thereof is provided radially inwardly of the second layer.

6. A method for producing a hose as recited in claim 5, the method comprising the steps of:
    subjecting an outer surface of a first layer comprising at least one of polybutylene naphthalate and polybutylene terephthalate as an essential component to an electric discharge treatment to cause the outer surface of the first layer to have an oxygen-to-carbon atomic ratio (O/C) of not smaller than 0.35; and
    bonding a second layer comprising an amine-rich resin as an essential component to the outer surface of the first layer, whereby the first layer is provided radially inwardly of the second layer.

7. A method for producing a bonded laminate structure as recited in claim 1, the method comprising the steps of:
    subjecting a surface of a first layer comprising at least one of polybutylene naphthalate and polybutylene terephthalate as an essential component to an electric discharge treatment to cause the surface of the first layer to have an oxygen-to-carbon atomic ratio (O/C) of not smaller than 0.35; and
    bonding a second layer comprising an amine-rich resin as an essential component to the surface of the first layer.

* * * * *